United States Patent [19]
Baitz et al.

[11] Patent Number: 5,412,191
[45] Date of Patent: May 2, 1995

[54] SERVICE DESK FOR THE REGISTRATION, BOOKING AND/OR PAYMENT OF GOODS, VOUCHERS AND THE LIKE

[75] Inventors: Günter Baitz, Berlin; Joachim Burchart, Schlangen, both of Germany; Rory Gray, Crowthorn, Great Britain; Stefan Mertz, Schliersee; Dirk Sporleder, Hövelhof, both of Germany

[73] Assignee: Siemens Nixdorf Informationssysteme Aktiengesellschaft, Paderborn, Germany

[21] Appl. No.: 30,366

[22] PCT Filed: Mar. 21, 1991

[86] PCT No.: PCT/EP91/00551
§ 371 Date: Mar. 18, 1993
§ 102(e) Date: Mar. 18, 1993

[87] PCT Pub. No.: WO92/04849
PCT Pub. Date: Apr. 2, 1992

[30] Foreign Application Priority Data

Sep. 21, 1990 [DE] Germany .............. 90 13 392 U

[51] Int. Cl.6 .............. G06K 15/00; G07B 15/02
[52] U.S. Cl. .............. 235/383; 235/384; 364/405; 361/681

[58] Field of Search ............ 235/383, 384; 186/59, 186/61, 67; 361/680, 681, 682, 683, 684, 685, 686; 312/223.3; 364/467, 405

[56] References Cited

U.S. PATENT DOCUMENTS

| | | | |
|---|---|---|---|
| 3,984,075 | 10/1976 | Bahner et al. | 361/683 |
| 4,877,947 | 10/1989 | Mori | 364/405 X |
| 5,019,694 | 5/1991 | Collins, Jr. | 235/383 |
| 5,113,183 | 5/1992 | Mizuno et al. | 364/405 X |

FOREIGN PATENT DOCUMENTS

| | | |
|---|---|---|
| 0283241 | 9/1988 | European Pat. Off. . |
| 3308872 | 9/1984 | Germany . |
| 8711758 | 11/1987 | Germany . |
| 3723316 | 10/1988 | Germany . |
| 9001284 | 5/1990 | Germany . |
| 2211786 | 7/1989 | United Kingdom . |

*Primary Examiner*—Donald Hajec
*Assistant Examiner*—Jeffrey R. Filipek
*Attorney, Agent, or Firm*—Hill, Steadman & Simpson

[57] ABSTRACT

In the case of a service desk for the registration, booking and/or payment of goods, vouchers and the like, having a service section (38) including at least a data display device (28), a data input device (26) and an output device (22, 24) for coupons, receipts and the like, this service section comprises at least two parts (14; 20, 28), of which a first part (14) is always on the customer's side of the service desk and a second part (20, 28) can be moved between the customer's side and the operator's side of the service desk.

18 Claims, 5 Drawing Sheets

SERVICE DESK FOR THE REGISTRATION, BOOKING AND/OR PAYMENT OF GOODS, VOUCHERS AND THE LIKE

BACKGROUND OF THE INVENTION

1. Field of the Invention

The invention relates to a service desk for the registration, booking and/or payment of goods, vouchers and the like, having a service section including, for example, at least a data display device, a data input device and an output device for coupons, receipts and the like.

2. Description of the Related Art

Such desks are known, for example, as check-in counters in airport departure concourses and are arranged in a great number next to one another in so-called check-in lines. It can be observed that, particularly at slack times, only some of the check-in counters are occupied by operators. Long lines then form there, while the unoccupied counters stand empty.

This situation leads to dissatisfaction on the part of the passengers. Many of them travel frequently by aircraft and would therefore be quite able without anyone else's assistance to complete the necessary formalities before embarking on a flight. The present situation is likewise unsatisfactory for the airline, since the high investments for the counters and the data processing equipment is in contrast to only a low degree of use.

A similar problem occurs in the case of goods registration and payment terminals for stores, so-called check-out terminals. Such terminals are known, for example, from supermarkets, where they are arranged in a great number next to one another in the so-called check-out lines. Here too, it can be observed that, particularly at slack times, only some of the check-out terminals are occupied by operating staff. Long lines then form there, while the unoccupied terminals cannot be used.

Here too, many of the customers, who frequently have only few articles to pay for, would be quite able without anyone else's assistance to register the identification of the goods, for example via a bar-code marking, and pay the invoice amount without cash with the aid of a credit card or pay in cash at a central cash desk after receiving a bill. With regard to the degree of use of the check-out terminals, the same considerations apply here for the operators of the store as for the airlines in the case described above.

In German Patent Application 23 39 595 a bulletproof service desk is described, in which a customer's side and an operator's side are separated by a bulletproof glass wall, in which a pass through and under which a turntable with a hollow are arranged.

SUMMARY OF THE INVENTION

The invention is based on the object of providing a service desk of the type mentioned at the beginning which can be used optionally in served mode or in self-service mode, while avoiding the disadvantages mentioned above.

This object is achieved by a service section of the service desk having at least two parts, of which a first part is always on the customer's side of the service desk and includes at least one reader for machine-readable data, in particular a card reader, as well as an input keyboard for manually inputting data, and of which a second part is movable between the customer's side and the operator's side of the service desk and includes at least a visual display unit, a data input device for manually inputting data and at least one output opening, in particular for coupons and receipts.

The service section is divided into at least two parts, the first part always being on the customer's side of the service desk and the second part being able to be moved between the customer's side and the operator's side.

In this case, the first part of the service section advantageously includes at least a reader for machine-readable data, in particular a card reader for the reading of identity cards, check cards and the like as well as an input keyboard for the manual input of data. In the case of a preferred embodiment of the service desk according to the invention, the second part of the service section is equipped with a visual display unit, an input device for the manual data input and an output device for coupons, vouchers and receipts.

Consequently, it is possible to carry out bookings at the service desk and pay the costs incurred thereby even without cash. The necessary data for a booking are in this case communicated to a booking system, generally a data processing system, with the aid of the input device provided in the second part of the service section. This system thereupon initiates the output of booking receipts and vouchers, such as for example a ticket or a boarding card. The customer can pay the booking costs without cash by a credit card, which he introduces into the document reader arranged in the first part of the service section. The input keyboard, likewise located in this part of the service section, can in this case be used by the customer for the input of his personal identification number.

If the second part of the service section of the booking or service desk is facing the customer, the latter can perform the booking himself. If, on the other hand, it is facing the operator side, the bookings are performed by an operator who is sitting opposite the customer on the other side of the service desk. The customer then does not have access to the booking means, but can continue to perform payments by a credit card in the way described above.

In the case of a further embodiment of the service desk according to the invention, in the second part of the service section there is provided a further output opening, from which baggage labels, so-called bag tags, can be removed, for example after a request to do so via the data input device.

The booking receipts may be already preprinted and fed to the respective output opening from a supply container on request via the data input device. If, however, an output opening is assigned a printer, booking-specific print-outs can also be made available to the customer.

According to a further feature of the invention, a reader for printed machine-readable data may also be arranged in the second part of the service section. With this reader, for example the bar-coded ticket identification data printed on a flight ticket can be read. The booking system can then assign the ticket number to the booking for which the ticket was issued at another location, for example in a travel agency, and for example produce a boarding card without further manual data inputs.

In the simplest case, the data input device is a generally known computer keyboard. In a preferred embodiment of the service desk, however, it is designed as a touch-sensitive area in front of the screen. This turns the latter into a so-called touch screen terminal. This further simplifies the operation of the booking desk, in particular for the customer. For his inputs, he, for example, need only point with a finger at the information represented on the screen in order to perform an input into the booking system. It is also possible, however, to arrange freely programmable keys, so-called soft keys, at the edge of the screen, the function of which is indicated on screen areas respectively alongside the keys.

The second part of the service section is expediently arranged on an upright column, it being possible for at least a section of the column, bearing the second part of the service section, to be rotatable about a vertical axis. As a result, the moving of the second service section part from the customer's side to the operator's side of the service desk, and vice-versa, is particularly facilitated. In this case, the rotatable column part may be mounted on a live ring or bear on its underside, close to the outer edge of its bottom face, rollers or balls which, during the rotation of the rotatable column part, roll on the supporting face of the latter. To increase the operating reliability, the second part of the service section can expediently be locked both in the position facing the operator and in the position facing the customer. The locking may also be performed with the aid of a lock which can be actuated only by the operator, so that the position of the second part of the service section cannot be changed by the customer.

In the case of a preferred further development of the invention, at least a portion of the second part of the service section is designed in the form of a sheet-like inclined panel, the upper edge of which is offset toward the column axis. Operation is simplified by the inclination of the panel. Similarly, the first part of the service section may be a sheet-like inclined panel, the angle of inclination of which corresponds essentially to that of the portion of the second part of the service section. Operating ease can in this case be further increased by the panels of the two portions of the service section forming an obtuse angle with each other when the second part of the service section is facing the customer.

In the case of a preferred embodiment of the service desk, the first part of the service section is fixed. Since this part is always facing the customer and also does not have to be moved, this embodiment can be produced at a particularly reasonable price.

The above explanations refer in particular to an embodiment of the invention in which the service desk can be used, for example, as a booking desk for checking-in at airports. For use of the service desk according to the invention for the registration and payment of goods, it is expedient if the first part of the service section of the service desk includes a goods registration device in the range of access of customers and an operator and if the service section comprises a third part which is exclusively accessible to the operator. The third part may in this case include a receptacle for a cash drawer, which can be coupled to a data processing device connected to the service desk. The goods registration device may, for example, be formed by an optical scanner bar-code reader.

With the embodiment described above it is possible to have the goods selected by the customer registered optionally by the customer himself or by an operator. The invoice amount may be paid in cash or else without cash. The necessary data for a payment are in this case communicated to a payment system, generally a data processing system connected to the service desk, with the aid of the bar-code reader located in the third part and/or the input device provided in the second part of the service section. This system thereupon initiates the output of a payment receipt, such as for example a sales slip. The customer may pay the invoice amount without cash by a credit card, which he introduces into the card reader arranged in the first part of the service section. The input keyboard, likewise located in this part of the service section, may in this case be used by the customer for the input of his personal identification data.

If the second part of the service section of the service desk or payment terminal is facing the customer, the customer can perform the payment himself. If, on the other hand, it is facing the operator's side, the payment is performed by an operator. The customer then does not have access to the data display or the input and output means of the second part, but can continue to perform payments by a credit card in the way described above.

A cash drawer can be inserted into the receptacle for it when required. This has the advantage that, when a service desk is not in use, there is no need for the presence of a cash drawer, which could invite violent attempts to open it. If, however, a cash drawer is arranged permanently at the terminal, it may be provided that the second part of the service section swivelled into the self-service position covers over the cash drawer and thus makes it inaccessible. Consequently, the locking of the second part of the service section in this position has the effect of blocking access to the cash drawer.

The cash drawer may be both designed as a sliding drawer and provided with a hinged lid. In any case, the cash drawer is expediently arranged in such a way that its opening faces away from the customer's side, in order to prevent anyone from reaching into the opened drawer with the intent of theft.

In the case of a further embodiment of the invention, the second part of the service section may be vertically adjustable and able to be swivelled in its angle of inclination with respect to the vertical. This has the advantage that this part of the service section can be set ergonomically correctly both for the generally seated operator in the case of the served mode and for the standing customer in the case of the self-service mode.

Furthermore, a customer display device which can be swivelled about its vertical axis and allows the payment operations to be conveniently displayed to the customer even in the served mode may be arranged on the upper side of the second service part.

BRIEF DESCRIPTION OF THE DRAWINGS

Further features and advantages of the invention emerge from the following description, which explains the invention with reference to exemplary embodiments in conjunction with the enclosed drawing, in which.

DETAILED DESCRIPTION OF THE PREFERRED EMBODIMENTS

Figure 1:
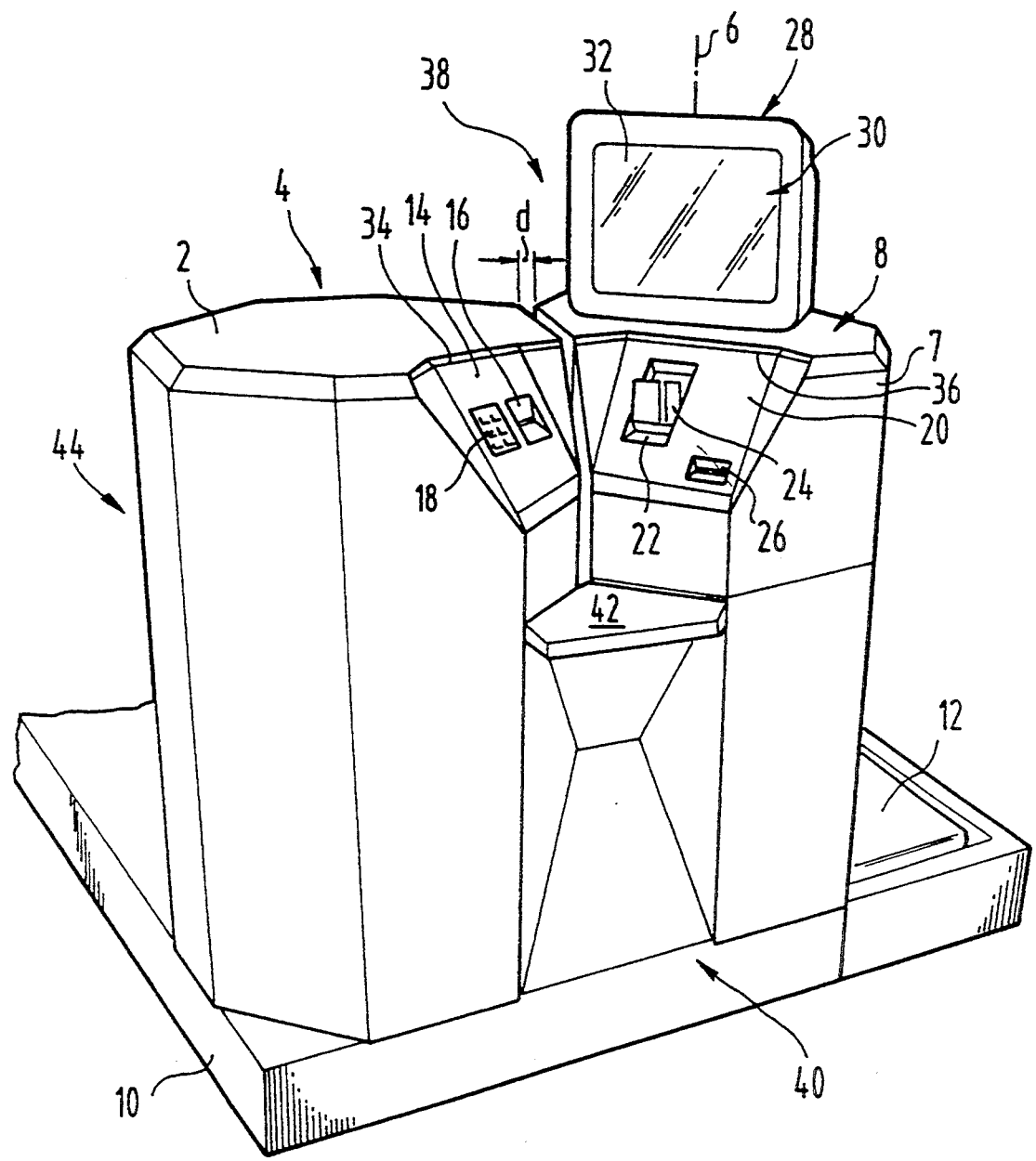
FIG. 1 shows a perspective view of a booking desk according to the invention from the customer's side, with the second service section part facing the customer.
Figure 2:
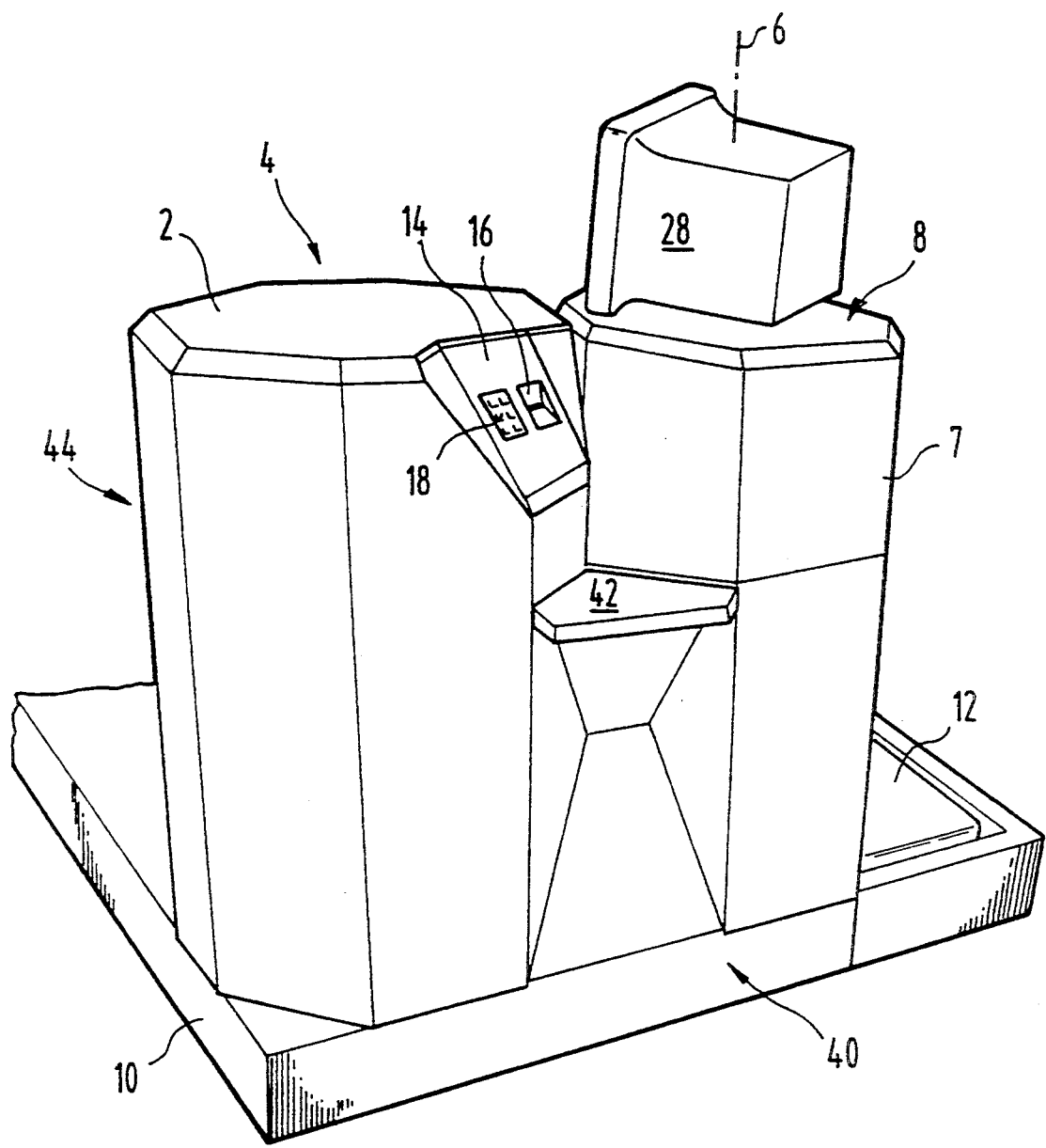
FIG. 2 shows a perspective view as in FIG. 1, but with the second service section part facing the operator.

FIGS. 1 and 2 show a booking desk which is intended, for example, as a check-in counter at airports. The booking desk essentially comprises a fixed desk part 4, designed as an octagonal column 2, and a second desk part in the form of an upright second octagonal column 8, the upper section 7 of which is rotatable about the vertical longitudinal axis 6 of the column. The two columns 2, 8 are arranged next to each other on a podium 10. Alongside the column 8 there is next to the podium 10 a baggage conveyor belt 12, which may be assigned a baggage weigher (not shown).

The fixed column 2 has in its upper third a first service area 14 with a card reader 16 and an input keyboard 18. The rotatable column section 7 likewise has a service area, which is denoted by 20. This includes a first output opening 22 for the output of coupons and the like, a second output opening 24 for baggage labels (bag tags) and a bar-code reader 26. Arranged on the column 8 is a visual display unit 28 with a data input device 30, which is designed as a touch-sensitive area 32. The service areas 14, 20 are inclined by the same angle of inclination toward the outer face of the respective column 2, 8 in such a way that their respective upper edge 34, 36 is offset toward the interior of the column. The service areas 14, 20, the visual display unit 28 and the data input device 30 together form the service section 38. On the customer's side 40 of the booking desk there is underneath the service section a shelf 42 for hand baggage.

While FIG. 1 shows the booking desk in a setting for self-service mode with service section 38 facing the customer's side 40, in FIG. 2 the booking desk is set for served mode. In this setting, only the area 14 representing the first service section part faces the customer's side, while the second service section part, comprising the second service area 20, the visual display unit 28 and the input device 30, is turned toward the operator's side 44. In both settings, the two columns 2, 8 are parallel to each other with one of their outer faces. They are spaced apart from each other by the dimension d, so that when the rotatable column section 7 is rotated its edges do not quite touch the fixed column 2.

In the served mode (FIG. 2), a customer will tell the operator his wishes and, if appropriate, surrender his ticket for processing. The customer is then requested to place his baggage on the baggage conveyor belt 12. The operator commences a dialog with the booking system via the second service section part, hands the customer his ticket and possibly a boarding card and a baggage slip, provides the baggage with baggage labels and quotes the customer a price for the services performed. If the customer wishes to pay the amount without cash, he introduces a credit card into the card reader 16 and inputs his personal identification number on the keyboard. This ends the booking operation.

In self-service mode (FIG. 1), the customer inputs his booking wishes, such as for example the purchase of a ticket, via the data input device 30 into the booking system, being aided by corresponding displays and dialog questions from the visual display unit 28. After completion of the booking, the price is indicated to him, which he can pay in the way described above. Then he is issued a ticket and, if appropriate, a boarding card, a baggage label and a printed receipt for the amount paid.

If the customer already has a ticket and would just like to "check in", ie. hand over his baggage and obtain a boarding card, he introduces his ticket into the reader 26 in such a way that the bar-code marking on the ticket can be registered by the device. He then receives a boarding card and baggage label for the flight booked.

The booking desk according to the invention is suitable not only for use at airports, but can be used generally by the operators of public means of transport, or else by organizers of trade fairs and exhibitions or sporting events. The booking desk can also be used advantageously in banking.

In an advantageous further development, there is preferably arranged on the upper side of the second service part a customer display device which can swivel about its perpendicular axis and allows the reckoning operations to be displayed to the customer in the served mode.

Figure 3:
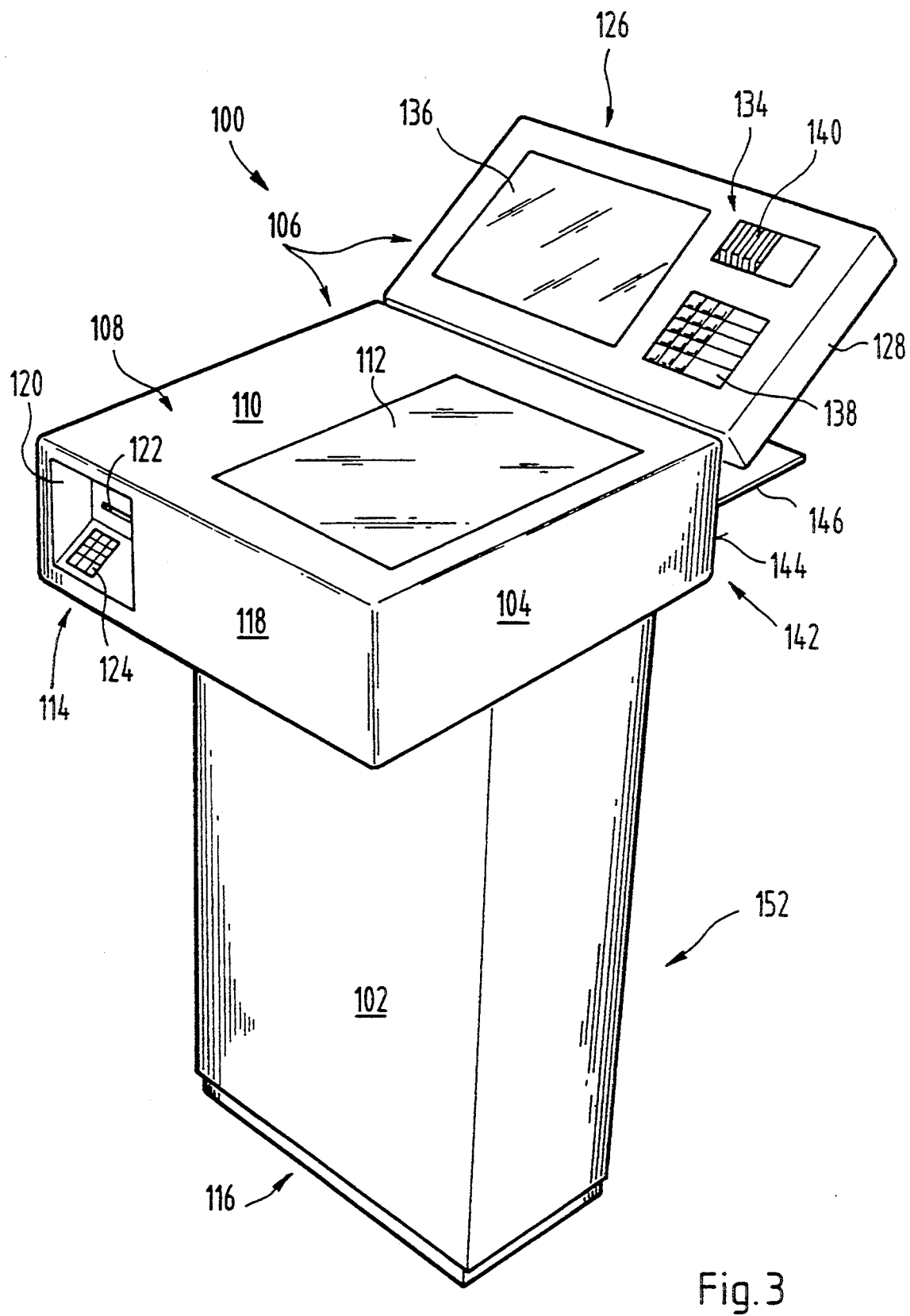
FIG. 3 shows a perspective view of a goods registration and payment terminal according to the invention from the customer's side, with the second service section part facing the customer.
Figure 4:
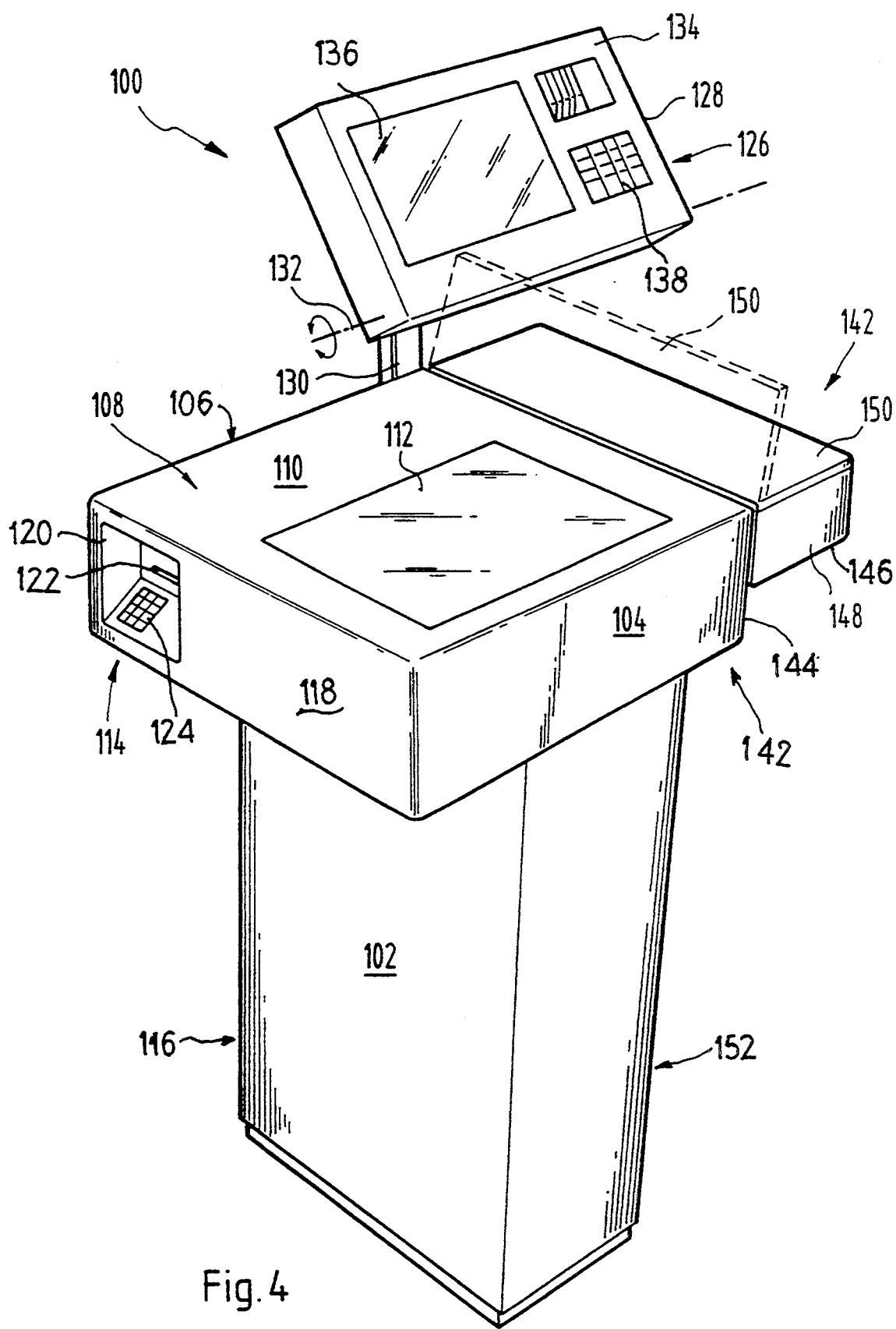
FIG. 4 shows a view corresponding to FIG. 3, with the service section part facing the operator.
Figure 5:
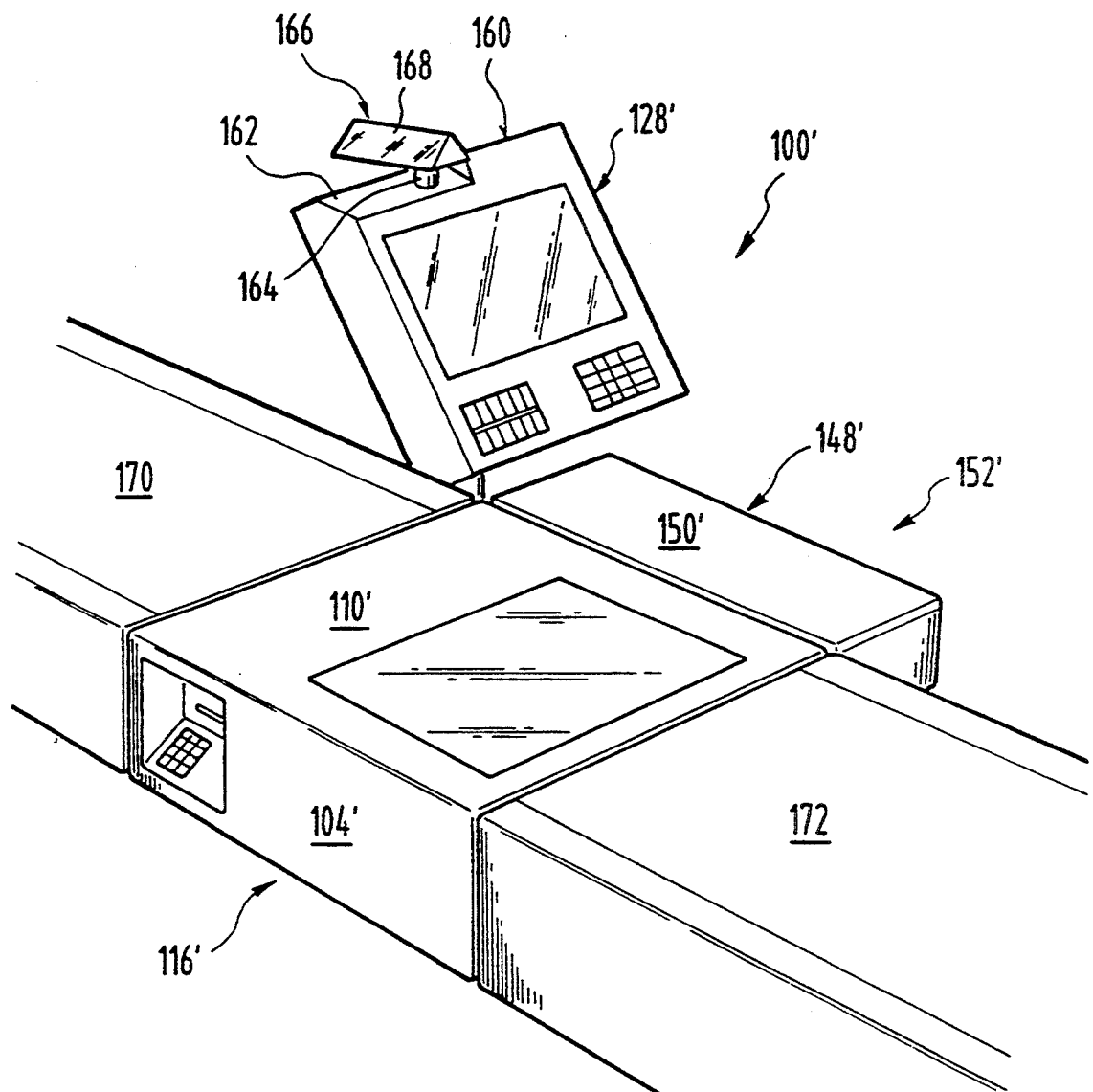
FIG. 5 shows a view corresponding to FIG. 4 of a further embodiment of a goods registration and payment terminal which is installed in a goods conveyor belt.

A further exemplary embodiment of the invention in the form of a goods registration and payment terminal, a so-called check-out terminal, is represented in FIGS. 3 to 5 and described in more detail below.

In FIG. 3 a check-out terminal 100 is represented in a perspective view. This has a column-shaped lower part 102, in which a computer (not shown) is arranged. On the lower part 102 there is an upper part 104, with a service section 106 divided into 3 parts.

A first service section part 108 comprises a goods registration area 110, recessed into which is a goods registration window 112. Underneath this there is an optical scanner bar-code reader (not shown) for the registering of machine-readable markings provided on the goods. This part can be reached both by the customer and by an operator.

A second service section part 126 comprises a housing 128, which is fastened on a column 130—fitted in a way not shown on the left-hand side in FIG. 4 of the lower part 102. The column 130 bears the housing 128 on its left-hand side in FIG. 4. The housing 128 is held on the upper end of the column 130 in such a way that it can swivel with respect to the perpendicular about a swivel axis 132 parallel to the goods registration area 110. Furthermore, the housing 128 is able to swivel about the longitudinal axis of the column 130 in such a way that its front lower edge can be optionally set essentially parallel or perpendicular to the front side 118 of the upper part 104. The column 130 is variable in its free length, so that the height of the housing 128 can be adjusted with respect to the goods registration area 110.

As shown in FIG. 3 on the front side 134 of the housing 128 there is a screen 136 of a visual display unit, a data input device 138 and an output opening 140 for payment receipts (so-called sales slip).

The third service section part 142 is on the rear side 144 of the upper part 104. Arranged on the rear side 144 is a plate-shaped receiving device 146 as shown in FIG. 3, protruding essentially perpendicularly from the rear side, for a cash drawer 148 as shown in FIG. 4. When placed on the receiving device 146, the cash drawer is mechanically locked to the latter and electrically connected to the computer located in the lower part 102.

The first service section part further comprises a panel 114, which is arranged on the customer's side 116 of the check-out terminal 100, on the front side 118 of the upper part 104. Recessed into the front side 118 is a hollow 120, in which a card reader 122 and an input keyboard 124 are located. The panel 114 may be dispensed with if, for organizational reasons, non-cash payment is not desired at the check-out terminal.

In FIG. 3, the check-out terminal 100 is represented in a setting for self-service mode. For this purpose, the second service section part 126 is set in such a way that the front lower edge of the housing 128 comes to lie directly on the upper edge of the rear side 144 of the upper part 104 and parallel to the latter. The housing 128 is inclined far back, so that a person standing on the customer's side 116 has the screen 136 in full view and can reach the data input device 138 and the output opening 140 well with both hands.

The goods registration and payment operation then proceeds as follows: the customer uses one hand to pass the purchased articles over the goods registration window 112 in such a way that the goods identifications provided on the goods are registered by the bar-code reader located underneath. For checking the registering operation, the data of the registered articles, such as designation and price, are indicated on the screen 136. Once the last article has been registered, the customer actuates a key marked "end key" on the data input device 138. A payment receipt, for instance a sales slip, from which the invoice amount can be taken, is thereupon output from the output opening 140. Depending on the form of organization of the store, the customer can settle the invoice amount at a cash desk, which he will inevitably be taken past on his way to the exit, or he can pay the invoice by a credit card directly at the check-out terminal 100. For this purpose, he introduces his credit card into the card reader 122 and inputs his personal identification number on the input keyboard 124. Once the booking operation has been ended, the customer receives a receipt from the output opening 140.

In FIG. 4, the check-out terminal 100 is represented in a setting for the served mode. For this purpose, the second service section part 126 is swivelled about the longitudinal axis of the column 130 in such a way that the front lower edge of the housing 128 is perpendicular to the upper edge of the rear side 144 of the upper part 104. Consequently, the receiving device 146 is released, so that the cash drawer 148 can be placed on it and locked to it. At the same time, the cash drawer is electrically connected to the computer which is located in the lower part 102 and can then control the opening of the cash drawer lid 150 in a known way in dependence on the reckoning operations.

In the position described above, the housing 128 is swivelled so far to the side that it is completely next to the upper part 104. As a result, the cash drawer lid 150 can be fully swung open, as is shown by dashed lines in FIG. 4. The inclination of the housing 128, and consequently of the second service section part 126, and its height, are then set in a way corresponding to the ergonomic needs of the operator seated on the operator's side 152.

In served mode, the goods registration and payment operation proceeds as follows: either the customer or the operator uses one hand to pass the purchased articles over the goods registration window 112 as described above. The operator ends the registering operation as described above and gives the customer the payment receipt. If the customer wishes to pay in cash, the operator opens the cash drawer 150 in a way known per se by actuating a key on the data input device 138 for the reckoning and return-of-change operation. If paying without cash, the customer proceeds as in the case of the self-service mode.

In FIG. 5, a further exemplary embodiment of the check-out terminal according to the invention is shown. In this case there is a cutout 162 on the upper side 160 of the housing 128'. Protruding from the cutout is an upright tube 164, on the upper end of which a housing 166 of triangular cross section is fastened. The latter comprises a customer display 168.

In the setting for served mode of the check-out terminal 100' shown in FIG. 5, the customer display 168 is turned toward the customer's side 116'. In the self-service mode, the customer display 168 is turned through 90° with respect to the position represented, so that the housing 166 is inserted into the cutout 162 and thus completes the housing 128' to form the full right-parallelepipedal form.

It can also be seen from FIG. 5 that the upper part 104' of the check-out terminal 100' has a depth dimension which corresponds to the width of commercially available goods conveyor belts 170, 172. Only the cash drawer 148' is arranged on the operator's side 152' outside the line formed by the conveyor belts. The cash drawer lid 150, the goods registration area 110' and the conveyor belts 170, 172 in this case form a continuous surface.

During goods registration, the operator takes the articles brought along by the feeding conveyor belt 170 and pushes them over the goods registration area 110' onto the removal conveyor belt 172. When so doing, the operator can support his hand and his lower arm on the lid 150 of the cash drawer 148', thereby ensuring that work is not very tiring.

In the case of all the embodiments, it may be provided that the movable service section part can be locked in its respective position by means of a lock, and consequently can be moved only by an authorized person. This is advisable, for example, whenever in self-service mode access to the cash drawer is blocked by the second service section part.

Although other modifications and changes may be suggested by those skilled in the art, it is the intention of the inventors to embody within the patent warranted hereon all changes and modifications as reasonably and properly come within the scope of their contribution to the art.

We claim:

1. A service desk for registration, booking and/or payment of goods and vouchers, said service desk having a customer's side and an operator's side opposite said customer's side, comprising:

a service section including first and second parts, said first part always being on said customer's side of said service desk and including at least one reader for machine-readable data accessible from said customer's side, as well as an input keyboard for manual input of data from said customer's side, and said second part including means for movement of said second part between a first position at the customer's side for a self-service mode operation and a second position at said operator's side of said service desk for a served mode operation and including at least a visual display unit, a data input device for manual input of data from said customer's side or from said operator's side depending on whether said second part is in said first position or in said second position and at least one output opening.

2. A service desk as claimed in claim 1, further comprising: a printer mounted at said at least one of the output opening for printing documents to be emitted from said at least one output opening.

3. A service desk as claimed in claim 1, wherein said visual display unit comprises a screen and said data input device comprises a touch-sensitive area of said display screen.

4. A service desk as claimed in claim 1, wherein said second part includes a reader for machine-readable data.

5. A service desk as claimed in claim 1, further comprising: an upright column on which said second part is arranged.

6. A service desk as claimed in claim 5, wherein said upright column includes at least one section rotatable about a vertical axis.

7. A service desk as claimed in claim 5, wherein said second part includes an inclined sheet-like panel having an upper edge beveled toward said vertical axis.

8. A service desk as claimed in claim 7, wherein said first part includes a sheet-like inclined panel having an angle of inclination substantially similar to an angle of inclination of said inclined sheet-like panel of said second part.

9. A service desk as claimed in claim 8, wherein said first and second parts include panels that form an obtuse angle with each other when said second part is facing a customer.

10. A service desk as claimed in claim 1, wherein said first part is fixed.

11. A service desk as claimed in claim 1, further comprising: a goods registration device in said first part in a range of access of a customer at the customer's side and an operator at the operator's side and a third part of said service section which is exclusively accessible to the operator side.

12. A service desk as claimed in claim 11, wherein said third part includes a receptacle for a cash drawer.

13. A service desk as claimed in claim 11, wherein said goods registration device includes a code scanner.

14. A service desk as claimed in claim 1, wherein said second part includes there is arranged a customer display which is movable in its position separately from said second part.

15. A service desk as claimed in claim 1, wherein said at lest one reader includes a card reader.

16. A service desk as claimed in claim 1, wherein said at least one output opening includes means for outputting coupons or receipts.

17. A service desk for registration, booking and/or payment of goods and vouchers, comprising:
a service section including first and second parts,
said first part always being on a customer's side of said service desk and including at least one reader for machine-readable data, as well as an input keyboard for manual input of data,
said second part being movable between the customer's side and an operator's side of said service desk and including at least a visual display unit, a data input device for manual input of data and at least one output opening, and
means for locking said second part in a position facing an operator and for alternately locking said second part in a position facing a customer.

18. A service desk for registration, booking and/or payment of goods and vouchers, comprising:
a service section including first and second parts,
said first part always being on a customer's side of said service desk and including at least one reader for machine-readable data, as well as an input keyboard for manual input of data,
said second part being movable between the customer's side and an operator's side of said service desk and including at least a visual display unit, a data input device for manual input of data and at least one output opening,
a goods registration device in said first part in the range of access of a customer and an operator,
a third part of said service section which is exclusively accessible to the operator, wherein said third part includes a receptacle for a cash drawer, and
wherein said second part covers over said receptacle for the cash drawer when in a position facing a customer.

* * * * *